United States Patent [19]
Kuhn et al.

[11] Patent Number: 5,731,053
[45] Date of Patent: Mar. 24, 1998

[54] POTABLE LIQUID CONTAINER

[75] Inventors: Tino Kuhn, Bremen; Georg Schlenk, Sturh, both of Germany

[73] Assignee: DS-Chemie GmbH, Germany

[21] Appl. No.: 396,476

[22] Filed: Mar. 2, 1995

Related U.S. Application Data

[63] Continuation-in-part of Ser. No. 849,183, Mar. 11, 1992, Pat. No. 5,639,525.

[51] Int. Cl.$^6$ .............................. C09K 3/10; B65D 3/00
[52] U.S. Cl. ............... 428/369.2; 428/35.7; 428/36.8; 428/495; 215/341; 215/349; 215/350; 215/352; 525/240
[58] Field of Search ................... 215/341, 349, 215/350, 352, DIG. 2, DIG. 4; 428/35.7, 36.6, 36.8, 36.92, 495; 525/240

[56] References Cited

U.S. PATENT DOCUMENTS

| | | | |
|---|---|---|---|
| 4,232,132 | 11/1980 | Grigo et al. | 525/222 |
| 4,309,332 | 1/1982 | Fischer et al. | 525/229 |
| 4,664,275 | 5/1987 | Kasai et al. | 215/247 |
| 4,801,418 | 1/1989 | Bersano | 525/222 |
| 4,846,362 | 7/1989 | Schloss | 215/349 |
| 4,911,985 | 3/1990 | Jenkins et al. | 428/446 |
| 4,925,715 | 5/1990 | Sato | 428/40 |
| 4,981,231 | 1/1991 | Knight | 215/341 |
| 4,997,880 | 3/1991 | Van Der Groep | 525/222 |
| 5,045,594 | 9/1991 | Samuel et al. | 525/57 |
| 5,086,121 | 2/1992 | Hazelton et al. | 525/222 |
| 5,104,710 | 4/1992 | Knight | 525/222 |
| 5,186,991 | 2/1993 | Samuel et al. | 428/36.6 |
| 5,206,043 | 4/1993 | White | 215/349 |
| 5,211,974 | 5/1993 | White | 426/106 |
| 5,310,797 | 5/1994 | White | 525/99 |
| 5,362,531 | 11/1994 | Samuel et al. | 428/36.6 |
| 5,381,914 | 1/1995 | Koyama et al. | 215/341 |

FOREIGN PATENT DOCUMENTS

| | | |
|---|---|---|
| 439 947 | 8/1972 | Australia . |
| 0 092 318 | 10/1983 | European Pat. Off. . |
| 0 116 783 | 8/1984 | European Pat. Off. . |
| 0 129 310 | 12/1984 | European Pat. Off. . |
| 0 174 032 | 3/1986 | European Pat. Off. . |
| 0349304 | 1/1990 | European Pat. Off. . |
| 0 478 109 A1 | 4/1992 | European Pat. Off. . |
| 0 478 110 A1 | 4/1992 | European Pat. Off. . |
| 0 488 491 | 6/1992 | European Pat. Off. . |
| 0503124 | 9/1992 | European Pat. Off. . |
| 0 599 356 A1 | 6/1994 | European Pat. Off. . |
| 2 164 744 | 7/1987 | Japan . |
| 1 112 025 | 5/1968 | United Kingdom . |
| WO 92/21731 | 12/1992 | WIPO . |

OTHER PUBLICATIONS

"Miscibility", Encyclopedia of Polymer Science and Engineering, Supplement p. 455, Oct. 1989.

Abstract searched from Derwent–Abstracts, No. 66299A/37.

Abstract searched from Derwent–Abstracts, No. 76668 D/42.

Abstract searched from Derwent–Abstracts, No. 84–034305/06.

Abstracts searched from Derwent–Abstracts, No. 05135B/03.

Abstracts searched from Derwent–Abstracts, No. 88–017840/03.

(List continued on next page.)

*Primary Examiner*—Charles Nold
*Attorney, Agent, or Firm*—Merchant, Gould, Smith, Edell, Welter & Schmidt, P.A.

[57] ABSTRACT

Potable liquid containers including a container, container closure and a closure liner, where the closure liner is formed from a polymeric heterogeneous blend of unvulcanized and uncrosslinked butyl rubber and a thermoplastic polymer are described. The closure liners are used for containers with closures such as a twist crown, a crown cork or a screw cap, for bottles, jars and the like, and more specifically for beer, juice and soft-drink bottles with closures made of metal or plastics.

22 Claims, 3 Drawing Sheets

OTHER PUBLICATIONS

Abstract searched from Derwent–Abstracts, No. 68–0114Q/00.

Chemical Abstract, vol. 95, 1981, Ref. 20438a.

Hawley's Condensed Chemical Dictionary, (1987), p. 935, Defining "Polyethylene," Eleventh Edition Revised by N. Irving Sax and Richard J. Lewis, Sr.

EFFECTS OF OTHER POLYOLEFINS

| Composition | 1 | 2 | 3 | 4 |
|---|---|---|---|---|
| HDPE | 75 | 50 | 50 | 50 |
| BUTYL | 25 | 25 | 25 | 25 |
| PP |  | 25 |  |  |
| PP/PE Copolymer |  |  | 25 |  |
| PP Terpolymer |  |  |  | 25 |
| Talcum | 3 | 3 | 3 | 3 |

POTABLE LIQUID CONTAINER

CROSS-REFERENCE TO A RELATED APPLICATION

This application is a continuation-in-part of Ser No. 07/849,183 of Mar. 11, 1992 allowed U.S. Pat. No. 5,639,525.

The invention relates to containers for potable liquids, and to polymer compounds suitable for providing closures for such containers with a sealing element or closure liner, by in-shell or out-shell molding said liner inside said closure.

The invention relates more specifically to containers with closures such as a twist crown, a crown cork or a screw cap, for bottles, jars and the like, and even, more specifically to beer, juice and soft-drink bottles with closures made of metal or plastics.

Potable liquid container closures must be suitable for being fitted on the container simply and nevertheless with a reliable seal, while usually no secondary treatments should be necessary and the dimensions of the container opening and its state of conservation and roughness (for example in the case of returnable bottles) may vary a great deal. It has therefore already been known for a long time to provide such closures, for example crown corks, with an elastic sealing element on their inside facing the container mouth, which sealing element is pressed between the closure and the container when the closure is fitted and ensures tightness.

While formerly the inserts of crown corks or bottle screw closures were predominantly made of press cork which was, if appropriate, also coated with a thin plastics film or thin aluminium foil, sealing elements have for some time been produced completely from synthetic polymer compound. However, only polymer compounds which are durable and resistant enough and at the same time have the necessary elasticity are suitable for this.

In practice, PVC is still mainly used in such compounds; however, polyethylene and mixtures of these substances with vinylacetate or vinylacetate-ethylene copolymers have already been used.

The production of container closures with the use of such polymer compounds is described for example in German Auslegeschrift 20 33 064 and German Offenlegungsschrift 30 21 488.

However, these known polymer compounds still have considerable disadvantages. The use of PVC or other halogen-containing plastics leads to ever increasing difficulties in the disposal and neutralization of the used container closures finding their way into household refuse. In the usual inciteration treatment of household refuse, halogen-containing plastics produce acidic gases, the release of which into the atmosphere is harmful. The addition of low molecular weight plasticizers (for example phthalates), indispensable for adjustment of the required sealing properties, is not harmless either, for reasons of health care, since these plasticizers are partially released again from the PVC and can find their way into the human body via foodstuffs or beverages contained in the container. For this reason, upper limits are set by corresponding industry or government regulations to the amount of plasticizers in such polymer materials.

In many cases, polyethylene alone is unsuitable as a sealing material, in particular if temperature fluctuations or damaged container mouths are encountered in practical application. Pot reasons of tightness, known polyethylene sealings are, in addition, not suitable for carbonated beverages stored for more than a short period.

Turning more specifically to closures such as crown corks, screw caps and screw lids, which are usually made of metal (such as aluminium) or plastics (such as polyolefine material), the sealing element most often taking the form of a liner adhered to or placed loose in the closure, the following requirements are generally placed on such closures:

Good sealing properties, especially on poor or returnable containers. The liner must shape into the damaged surface, ensuring a gas or liquid tight seal, be it against loss or entry of gas or liquid.

In the case of screw-on closures, the closure must exhibit low closing and opening torques to facilitate trouble-free closing in the bottling plant and easy opening at the end user.

The product must have no flavour of its own which it can impart to the contents of the container.

The liner material must exhibit good adhesion to the cap material or the lacquer coating on the cap material, especially to polyolefine materials, as in polypropylene or polyethylene bottle caps, to ensure good retention of gases such as carbon dioxide and closure integrity.

The sealant must be placed correctly into the closure so that it is in full contact with the mouth of the bottle. It must also ensure that the integrity of the seal is guaranteed in the case of "cocked" closures.

The liner must meet the demands of e.g. the Food and Drug Administration relating to products in direct contact with foodstuffs or food products. In some countries such sealants may not contain PVC or ester based plasticizers due to health or disposal problems particularly when the products are incinerated.

The liner must be formable during production so that different profiles can be made to suit the different shapes and sizes of the bottle or jar opening. Equally, the product must show good "plastic memory" for reclosing the bottle.

The closure and the liner must withstand post-treatments, such as pasteurisation, hot-filling, cooling, transport, etc.

The liner must contain no surfactants which alter, for instance, the foam stability of beer.

The total closure must be produced economically and at maximum production speeds, presently e.g. approximately up to 2,500 caps per minute.

Today, closures of this kind must meet several additional demands:

The closure liner must be capable of being shaped by the in-shell molding process now dominant in the industry and/or, in some cases, the out-shell molding process;

the closures should have a valve or venting effect in case of any excess pressures arising in the container, in particular in beer, lemonade or mineral water bottles, and said venting effect should reliably occur at internal pressures between about 3 and 12 bar, preferably 5 and 10 bar;

when fitted, the closures should prevent any substances which would affect aroma and in particular also taste, from entering the container;

the closure should be capable of withstanding headloads as encountered in packaging, storage and handling of the filled containers, such as beer bottles, without damage to the liner.

The production of the closure with liner or sealant usually uses the so-called "in-shell" molding technique as provided e.g. by SACMI, Zapata and "HC" machines. The granules of the compound are fed into an extruder which melts and pumps the molten product to an orifice. External of this orifice is a rotating blade which cuts the extrudate into a pellet and flips or places it into the closure. Here two important characteristics of the invention's compounds are perceived, namely no adhesion to the blade and good flip properties where appropriate. If the flip properties are not good, then the pellet does not land centrally in the closure causing voids or flashing on forming.

After the pellet has been placed centrally in the closure, a die punch with a chosen profile presses down on the still molten pellet. This process spreads the sealant into the closure and simultaneously gives it the required profile. The product needs not only to form well but on cooling retain its dimensional stability without shrinkage or change.

Another important feature is that the "in-shell" molding machines must be able to run trouble-free at maximum speed with minimum rejects, enabling running speeds to be raised to an output of up to 2,500 closures/min.

At the bottling plant the closures must be screwed onto the bottle or the jar and have opening torque values below 0.22 kpm (20 inch/lbs.), preferably under 0.17 kpm (15 inch/lbs.). Having closed the bottle, which may have been hot or cold, filled or even pasteurized, the sealant must retain its shape and form. Most bottles are cooled to approximately 4° C. in fridges before consumption; also here no shrinkage may take place. It goes without saying that transport or storage in hot climates may not cause undue expansion or creep which would result in a loss of carbon dioxide.

Excess pressures in the container or container can result from over-heating and may lead to the container bursting. This not only results in the loss of the container's contents, but also presents a quite considerable danger of injury, in particular by glass splinters flying about. The valve effect of the closures is to ensure that the excess pressure (mostly $CO_2$) can be released in time and thus eliminated, without letting bacteria or moulds in.

Changes of the taste of the container's contents, in particular after long storage times, are mainly due to two influences, i.e. oxidative aroma changes after the entry of oxygen on the one hand, and changes of taste after the entry of other, in particular aromatic, substances such as benzenes or also phenyl ethers, for instance chloranisols. The latter are contained in objects comprising wood, such as pallets, cardboard boxes and the like and accumulate in packaging like welded foils, shrinking foils and suchlike. These substances are suspected of being able to penetrate through conventional polymer compound sealings and into the interior of containers. Even if present only in the ppm range, they already cause considerable changes in taste.

It is known that the colour and flavour of fruit juices are affected by oxygen. For this reason antioxidants usually organic acids, e.g. ascorbic and citric, are used. Highly acidic products are known to attack the milk teeth of infants and small children. It is desired to prolong the shelf life of fruit juices without the high acid levels of current products. This also applies to red wines where $SO_2$ is used to keep the red colour but many people are allergic to this process where headaches or rashes are well known.

In order to avoid the entry of oxygen, sealing elements have already been proposed which contain oxygen-bonding substances (oxygen scavingers). These substances are reducing agents to react with oxygen in the sealing element so that it does not reach the container contents. However, oxygen scavingers have so far not been successful for products in direct contact with beer etc., they often do not have perfect sensory properties and they lose their effect with time.

Containers filled with potable liquid, especially beer bottles, are often packaged for storage and distribution in a vertical arrangement, e.g. by placing the individual bottles in cartons or cardboard packs, and assembling a multiplicity of such packs on a pallet, in a stacked arrangement. This means that the lowermost pack must support the weight of several other packs placed vertically above it, and this exposes the individual closure to a considerable headload. This headload acts to press the closure against the container, and the pressure is transmitted through the closure liner inserted between the closure and the container mouth. At headloads customarily encountered in such procedures, liners that are too soft are cut through or otherwise damaged under the headload. Most companies set headloads of 40 to 45 kg per bottle to test for cut-through the liner.

The export beer industry of Europe presently uses a headload test for bottle crowns, wherein the closures are exposed to a headload of 60 kg at 38° C. for an extended time period. A successful closure for a container such as a beer bottle must be able to withstand such headloads.

German patent DE-OS 15 44 989 discloses sealing liners for containers or container closures which can comprise a variety of compounds. Amongst others, butyl rubber/polyethylene mixtures are also described. This prior art uses low-density polyethylene (LDPE) so as to ensure a particularly high-grade sealing and pressure holding characteristic over long periods of time at elevated temperature. Sealing elements made from these compounds are not suited for an excess pressure safety valve function. LDPE based liners are also damaged and cut under headloads as above described.

German patent DE 29 34 021 discloses a container closure including a separable liner, said liner being fixed to the closure capsule by means of an adhesive coating. This prior art discloses a variety of extrusion moldable thermoplastic resins, amongst others also low-density polyethylene (LDPE).

Similar compounds are disclosed in GB patent 1,112,025.

German patent application DE-OS 17 82 737 describes sealing elements for container closures made of a thermoplastic material, amongst others of a mixture of LDPE, butyl rubber and EVA polymers. Also in this case LDPE ensures high-grade sealing and pressure holding characteristic, with no safety valve function being provided.

Various further, similar prior art closure liners and sealing elements are known from DE-A1 15 32 416, DE-GM 18 77 377, DE-Al 33 07 904 and DE-A1 35 19 053.

German specification DE-AS 12 12 726, U.S. Pat. No. 4,911,985, U.S. Pat. No. 4,925,715 and European patent 0 116 783 disclose polymer mixtures containing high-density polyethylene which mixtures are used in different applications.

U.S. Pat. No. 5,211,974 to WHITE discusses beer bottles with caps comprising a sealing gasket formed of a blend of butyl rubber and thermoplastic polymers. The amount of butyl rubber is generally at least about 30% and is preferably about 50% by weight of the blend. The thermoplastic polymer must be selected such that a homogeneous blend with the butyl rubber can be formed, to form a homogeneous melt which can be extruded and molded into the cap. The blend is intended to provide good sealing properties, a barrier effect against the ingress of chlorinated phenols and chlorinated anisols and also a valve or venting effect at internal container pressures not exceeding 13 bar.

This is achieved by combining 50% butyl rubber with 50% HDPE. It is stated that a blend of 80% by weight HDPE and 20% butyl rubber requires a minimum internal pressure of 12 bar to have any valve effect and this is of course unacceptable.

Good barrier properties are also obtained with a 50:50 blend of MDPE and butyl rubber.

The assignees of U.S. Pat. No. 5,211,974 market liner compounds comprising homogeneous 50:50 blends of butyl rubber and low or high density polyethylenes. This compound provides adequate barrier and valve or venting effects, but has not been accepted by the export beer industry, because such soft liners fail in the above-described headload test.

Based on the accepted prior art teachings and disclosures such as GB-B 1,112,025 and U.S. Pat. No. 5,211,974, it was to be expected that at higher MDPE contents than 50 weight-%, or lower butyl rubber contents than 50 weight-%, at least one of the barrier, venting or mechanical resistance properties of the compound must deteriorate. One would have expected that improving one of these characteristics was only possible at the cost of harming another of these properties. Thus, making the compound harder to get better mechanical resistance under high headloads should negatively affect the venting properties. In view of the higher gas permeability of high-density polyethylene, one would also have expected deterioration of the barrier effect.

It is an essential object of the invention to make potable liquid containers and corresponding container closures available, which provide an improved barrier effect, preventing gaseous or vaporous substances such as oxygen and other flavour-impairing substances from entering the container.

A further essential object of the invention is to provide potable liquid containers which exhibit an excess pressure valve effect at interior container pressures of between approximately 3 and 12 bar, preferably between about 5 and 10 bar.

Another essential object of the invention is to provide potable liquid containers which can withstand headloads of up to 60 kg at elevated temperatures up to 38° C. without mechanical damage and can pass the corresponding industrial tests.

It is in particular an essential object of the invention to make potable liquid containers available which provide the said barrier function and the said excess pressure valve or venting effect in combination with said headload resistance, and which can therefore be advantageously used as containers for beer, juices or mineral water, and especially as beer bottles.

It is yet another object of the invention to provide polymer compounds for the production of said container closures with liners, which are suitably fitted directly on or in the closure by means of in-shell or out-shell molding, i.e. mechanical forming of the unshaped, thermally plastified polymer compound and its subsequent solidification to the desired hardness to give the finished elastic sealing element or closure liner.

In this respect, it is a further object of the invention to also meet the above-mentioned essential and general requirements placed on sealing elements for container closures.

These objects are attained by the features disclosed in the independent claims.

Advantageous embodiments are defined in the subclaims.

According to the invention, a potable liquid container comprises a container, a container closure and a closure liner or sealing gasket formed by placing and in-shell or out-shell molding a molten piece of a polymer liner compound in the closure, wherein the molded closure liner comprises a heterogeneous blend of unvulcanized and uncross-linked butyl rubber and thermoplastic polymer. The heterogeneous blend can, according to this invention, have a pseudolaminate structure consisting of areas or even layers enriched in butyl rubber adjoining or alternating with areas or layers enriched in thermoplastic polymer. This "sandwich effect" allows a very hard sealant (Shore hardness approximately D 52) to seal well when combined with the cushioning effect of the rubber layer(s).

The invention includes to chose the weight ratio of butyl rubber and thermoplastic polymer in the heterogeneous blend such that a controlled partial mixing incompatibility of the butyl rubber and the thermoplastic polymer in the solid molded state of the liner compound is provided, when said structure is formed by the in-shell or out-shell molding of said blend.

According to the invention, the thermoplastic polymer is preferably high-density polyethylene, HDPE. While it is presently generally preferred to use only HDPE, it is possible and can be advantageous for special applications, to replace at least some of the HDPE by other hard polymers. Among these, polypropylene and its copolymers such as polypropylene/polyethylene and terpolymers such as poly-(propylene-butene/ethylene) are preferred. Such other hard polymers will often not be combined with HDPE in a higher than 50:50 ratio, i.e. HDPE will still be the major component. Another alternative, which is presently less preferred for economical reasons, is poly-(ethylene-vinylalcohol), EVOH. Mixes of HDPE and EVOH or other such polymers are contemplated by this invention.

The invention includes containers wherein the liner compound comprises a heterogeneous blend of more than 60 weight-%, preferably about 70 to 80 weight-% HDPE and less than 40 weight-%, preferably about 20 to 30 weight-% butyl rubber. Specifically, the invention includes a container wherein the amount of HDPE in the liner compounds polymer blend is about 75 weight-%, the amount of butyl rubber being about 25 weight-%.

The invention includes potable liquid containers wherein the closure liner comprises a polymer liner blend consisting of unvolcanized and uncross-linked butyl rubber and thermoplastic polymer, preferably high-density polyethylene, wherein the liner further comprises a particulate filler material, which is preferably selected from platelike flat particles of talcum, mica, kaolin and mixtures thereof.

The invention also includes containers wherein the closure liner comprises a filler material which includes at least one zeolite substance, capable of physically binding at least one contaminant including oxygen and off-flavour producing substances such as volatile chlorinated phenols or anisols. These materials are not scavinger or reducing agents as known in the art. A-type zeolites are preferred.

It is one preferred feature which this invention includes, that the container is a bottle, and the closure is a bottle crown or a screw cap, especially a bottle crown made of metal or a screw cap made of aluminium or plastic material. Preferably, the bottle is then a beer bottle, the closure is then a crown cork and the bottle is filled with beer.

Alternatively, the bottle can be a juice or a soft-drink bottle, the closure can be a screw cap of screw lid, and the bottle is filled with juice or soft-drink.

The invention comprises a potable liquid container with a closure liner in its closure, said liner comprising a polymer liner blend substantially consisting of unvulcanized and uncross-linked butyl rubber and high-density polyethylene, and said closure being capable of preventing ingress of oxygen and volatile off-flavour producing substances into the potable liquid and at the same time being capable of venting gas and/or vapour from the container in the range between 5 and 12 bar.

The invention includes a potable liquid container, which is a bottle and has a container closure, which is a bottle crown, a closure liner or sealing gasket being provided in the bottle crown and comprising a polymer liner blend substantially consisting of unvulcanized and uncross-linked butyl rubber and high-density polyethylene, wherein said closure liner is not damaged when said crown closure is placed under a headload of up to 60 kg at a temperature of up to 40° C. or even up to 45° C.

The invention specifically includes such a potable liquid container which combines the above-mentioned capabilities of its closure to prevent ingress of oxygen and volatile off-flavour producing substances with the venting or excess pressure valve properties and the above-defined capability of withstanding headloads of up to 60 kg at elavated temperatures of 38° C., 40° C. or even 45° C.

Also included by this invention is a polymer liner compound, from which the liners or sealing gaskets of the above-mentioned containers can be made, which liner compound comprises a heterogeneous blend of between about 20 and 50 weight-% butyl rubber and between about 50 and 80 weight-% HDPE, especially a heterogeneous blend of about 25 weight-% butyl rubber and about 75 weight-% HDPE, We surprisingly find that the conceived wisdom of the prior art in this field, that it is desireable or even necessary to obtain a homogeneous blend and thus a homogeneous melt and a homogeneous molded liner, is wrong. Unexpectedly, it is more advantageous to use a heterogeneous blend of butyl rubber and thermoplastic polymer, i.e. a blend which in the solid molded state (and generally also in the melted, liquid or flowable state) consists of discrete separate phases enriched, respectively, in butyl rubber and in thermoplastic polymer. In the solid molded state, especially when the liner or sealing gasket has been shaped by in-shell or out-shell molding, this heterogeneous blend provides a pseudolaminate structure, with areas or layers enriched in butyl rubber adjoining or even alternating with areas or layers enriched in thermoplastic polymer, the planes of said areas or layers extending parallel with the centre panel of the closure, i.e. at right angles to the direction of pressure in the in-shell or out-shell molding Based on extensive testing and research, we presently assume that it is this pseudolaminate structure which makes it possible to have excellent barrier properties, surpassing those of 50:50 butyl rubber/HDPE compounds as in U.S. Pat. No. 5,211,974, together with valving properties at the required pressures below 13 bar, and to have both these effects in a liner which is physically strong enough to withstand a headload of 60 kg at temperatures at and above 38° C. without being cut through or otherwise mechanically damaged.

The physical-chemical basis of this heterogeneous structure appears to be a mixing incompatibility of the butyl rubber and the thermoplastic polymer. By selecting suitable types of polymer and weight ratios, this mixing incompatibility can be easily controlled to provide the desired structure.

It is envisaged that besides HDPE, other thermoplastic polymers can be used in the context of this invention, which show the same or a sufficiently similar mixing incompatibility with butyl rubber, and can therefore be expected to show the same heterogeneous physical structure in the solid molded state.

We have found that in the butyl rubber/HDPE systems we have selected, good results are obtained when the blend comprises more than 60 weight-% (based on total polymer content) of HDPE and less than 40 weight-% (on the same basis) of butyl rubber, when the blend comprises no other major polymer components. In such a case, the beet results were obtained with 70 to 80 weight-%, especially about 75 weight-% EDPE blended with 20 to 30 weight-%, especially about 25 weight-% butyl rubber.

We have surprisingly found that the pseudolaminate structure of our closure liners or sealing gaskets can, with a synergistic effect, be combined with filler materials, which themselves have a plateletlike, flat particle shape. We have obtained surprisingly good results with filler materials such as talcum, mica and kaolin, and mixtures thereof, which all comprise such plateletlike particles. We theorize that the flat, extended shape of the particles leads to their incorporation in some kind of layer, oriented arrangement in the pseudolaminate structure of the liner, provided by the in-shell molding of the liner.

Another filler or auxiliary material that can be incorporated in our liners is a zeolite substance, or, of course, more than one such substance. These substances can physically bind contaminants such as oxygen and off-flavour producing substances such as volatile chlorinated phenols or anisols, and can assist the barrier properties of the liner blend. They do not react chemically with oxygen or other substances producing an off-flavour.

The polymer compounds according to the invention may be produced from easily obtainable raw materials. They can be processed by means of machines already available for in-shell or out-shell molding and processing of comparable PVC materials, e.g. produced by the SACMI Company, Italy.

To improve the cutting and transporting behaviour of the polymer compound, a small content of a highly disperse silicic acid, an amide wax or other lubricant such as silicon oil or a fluoroorganic may advantageously be provided. The plastified polymer compound can be extruded, cut and subsequently compression-set without difficulties. It then hardens into the desired molding.

This molding, produced from the polymer compound in the container closure has, with good dimensional stability, an elasticity which is adequate to ensure tightness for all usual applications of container closures. The containers can undergo pasteurization with fitted closure, without the seal-molding suffering or leaking.

The sealing elements according to the invention provide for an excess pressure function between approximately 3 and 12 bar (especially about 5 and 10 bar) in that when a certain interior pressure in the container is exceeded, they yield elastically, thus enabling the material causing the excess pressure (mostly carbon dioxide) to exit. As soon as the interior pressure has decreased to the selected value again, at which the valve effect is obtained, the sealing element forces the container closure back on to the container, so that it is completely gastight. Bursting of the container due to unpredictable and undesired excess pressures in the container can thus be avoided. The interior pressure at which the excess pressure valve function occurs can be adjusted by adjusting the mixting ratio of the compound and, if necessary, additives influencing its mechanical properties.

At the same time the sealing elements according to the invention have a pronounced barrier effect against the penetration of e.g. oxygen, benzenes and chloranisols in the container. This barrier effect lasts undiminishedly for very long periods of time, thus preventing for example in the case of beer bottles packaged in cardboards or pallets and sealed in welded foils or shrinking foils, that the flavour of the beer is changed by the penetration of such substances. Surprisingly, this barrier effect is even stronger in the 50:50 compounds of U.S. Pat. No. 5,211,974.

The invention's containers can be used for the hot filling of e. g. fruit juices; they can also be pasteurized and still provide the barrier effect, also e.g. against oxygen or trichloranisol.

Since the polymer compound does not contain any low molecular weight plasticizers, it is harmless from the point of view of foodstuffs regulations; if it finds its way into household refuse, it cannot release any harmful acid gases in a refuse incineration plant, since it is halogen-free.

Container closures according to the invention comply with regulations, such as are specified for example in German Standard DIN 6099 for crown corks.

It goes without saying that the polymer compound according to the invention can be adapted to the particular requirements of various applications by its composition being appropriately chosen. For instance, its elasticity can be influenced by means of the total proportion of additives which modify the initial hardness of the components used.

The use of the polymer compound according to the invention has the further advantage that the moldings produced can be lighter than known sealing elements, for example of PVC. With the polymer compound according to the invention, for example, inner inserts for crown corks weighing only approximately 160 to 170 mg can therefore be produced, this is a not inconsiderable material saving in comparison with prior art inner inserts of PVC.

It should be understood that the invention is fully applicable to usual liner dimensions, e.g. liner weights between approximately 150 and 250 mg for crown corks; between 220 and 320 mg for aluminium screw caps; between 250 and 400 mg for plastic screw caps, and even higher weights for larger closures, as jar screw lids etc.

Flavour may not be imparted to the contents of the bottles, not even by the compound. Avoiding this is another important advantage of the invention. In fact, the invention's compounds are unaffected by any of the typical contaminants encountered in production, storage and transport of packaged beverages; they do not pick up any alien tastes or aromas prior to use, either.

The invention is further elucidated below with reference to exemplary embodiments, which concern inner liners for bottle crown corks made of metal. All weight-% statements are based on total compound weight, unless otherwise stated.

General procedure

A polymer compound is prepared by mixing butyl rubber (e.g. commercially available as "Polysar IIR 101/3" from Polysar) with thermoplastic polymer (e.g. EDPE such as "Eraclene HVG 5215 P" from Enichem). Further compounds such as highly dispersed $SiO_2$ or silicon oil, pigments, stabilizers and erucic acid amide as well as zeolite and/or talcum are, in case, added to the polymer compound.

The polymer compound produced in this way is fed to an HC (or SACMI or Zapata) machine, where it first passes into an extruder, in which it is melted. It leaves the outlet orifice of the extruder as a plastic extrudate, which is cut into individual pellets by a blade directly after the die orifice.

In in-shell molding each of these pellets, which each weigh approximately 180 to 200 mg, is individually flipped or placed onto the inner surface of a crown cork, an aluminium or a plastic closure which forms the body of a screw cap. The still plastic polymer compound is spread over this inner surface or centre panel by a die punch and stamped to form a thin, approximately disc-like molding. At the same time, it is possible to form any annular projections of the molding which may be desired, which embrace the bottle rim in the mouth region when the cap is fitted.

In out-shell molding, the pellet is formed outside of the closure, on a "puck", and is then placed in the closure and molded into its final shape. After cooling and hardening of the thermoplastic polymer compound, the molding forming the inner liner of the closure is no longer plastically deformable in normal conditions of use, but can bear elastically with sealing effect against the bottle rim when the closure is applied onto the bottle. Owing to its elasticity, the molding can thereby compensate for unevennesses (for example due to damage) and also for the roughness of the bottle rim caused by production tolerances.

Experimental

The following materials were used in the preparation of the embodiments and comparisons as described below:

LDPE—Lupolen 1800 S from BASF AG

MDPE—Eraclene HVG 5215 from ENICMEM

Butyl rubber—Polysar IIR 101/3 from POLYSAR

EVA—Elvax 250 from DUPONT

Talcum—Microtalc I.T. from Norwegian Talc

Zeolite—Wessalith AP400 from DEGUSSA

Mica—Micro-Mica W from Norwegian Talc

In a first set of experiments, oxygen barrier properties were evaluated.

EXAMPLE 1

A liner compound was prepared from 50 parts LDPE and 50 parts butyl rubber, in accordance with U.S. Pat. No. 5,211,974, as a comparative example.

EXAMPLE 2

A liner compound was prepared from 50 parts HDPE and 50 parts butyl rubber, also in accordance with U.S. Pat. No. 5,211,974, as another comparative example.

EXAMPLE 3

A liner compound in accordance with this invention was prepared from 75 parts HDPE and 25 parts butyl rubber.

EXAMPLE 4

A liner compound in accordance with this invention wae prepared as in Example 3, whereby three parts talcum were added.

EXAMPLE 5

A liner compound was prepared, in accordance with this invention, as in Example 3, whereby three parts mica were added.

EXAMPLE 6

A liner compound was prepared, in accordance with this invention, as in Example 3, whereby one part zeolite (Na-A) was added.

EXAMPLE 7

A liner compound was prepared from 50 parts HDPE, 25 parts butyl rubber and 25 parts EVA. This liner was used as another comparison.

As a further comparison, we used Dataform 6493M, a commercial liner compound corresponding to U.S. Pat. No. 5,211,974.

Figure 1:
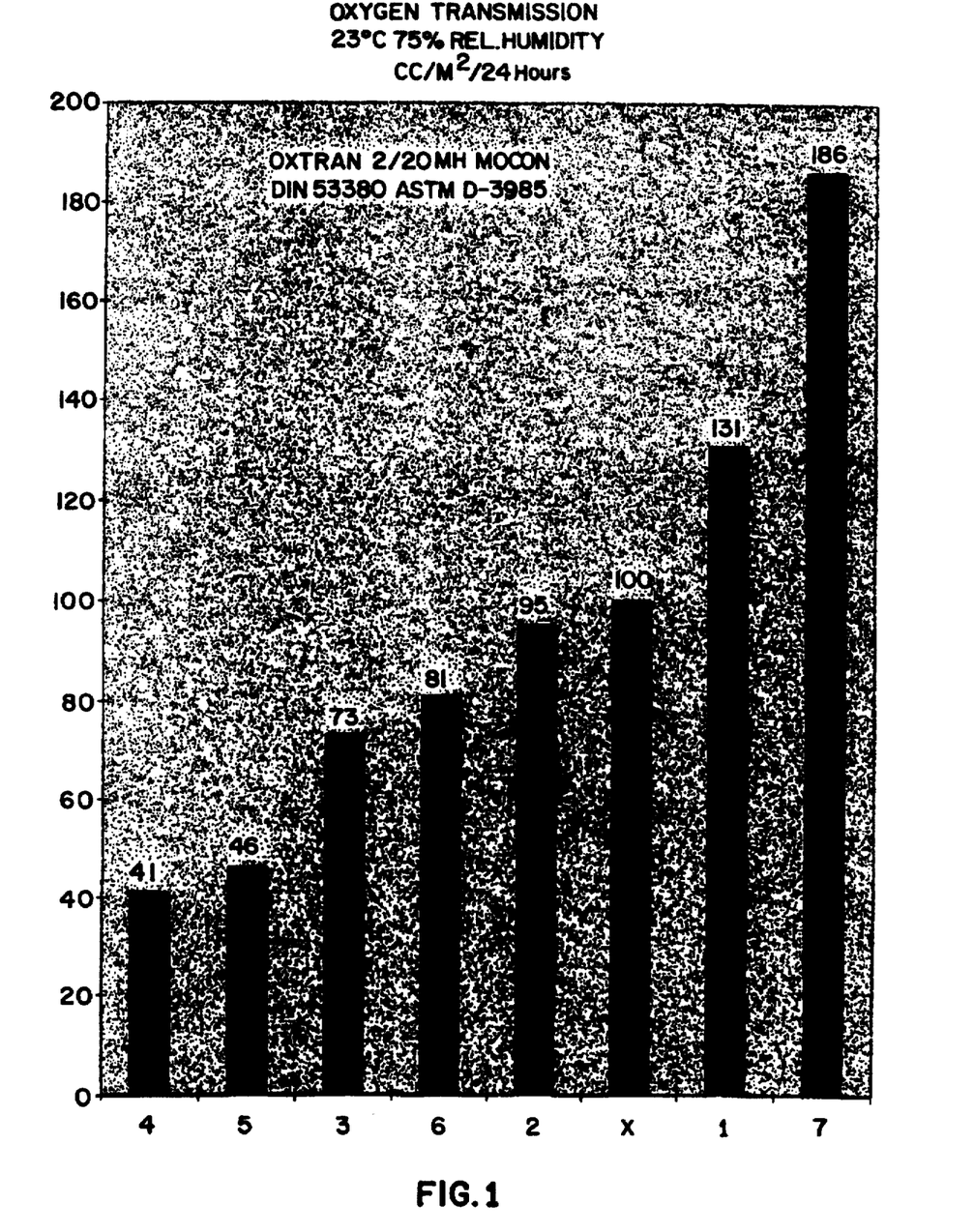
FIG. 1 is an illustration by bar graph of the results of comparative measurements of oxygen barrier properties with the liner compounds tested and the commercial sample.

With the above liner compounds, oxygen barrier properties were measured in accordance with the DIN 53380 standard coulometric method, which corresponds to ASTM D-398. The measurements were carried out on an OXTRAN 2/20 MH apparatus from MOCON, at 23° C. and 75% relative humidity. Each compound was measured twice. The film thicknesses varied between approximately 430 μm and 650 μm, most films being around 500 μm thick. The results were mathematically standardized for a 500 μm thickness, and are shown in FIG. 1. The numbers below the columns correspond to the numbers of the examples; "X" indicates the commercial Daraform sample.

The numbers above the columns correspond to the amount of oxygen measured in the test.

It is clearly notable from FIG. 1, that the best oxygen barrier properties are provided by the invention's liners containing talcum or mica. Zeolite addition has no, clear beneficial effect.

In a second set of experiments, the barrier properties against trichloranisol migration (4 weeks at 45° C.) were tested on samples made in accordance with the following examples:

Examples 1 to 4, corresponding to above described Examples 1 to 4 of the oxygen barrier tests;

Example 5, corresponding to Example 6 of the oxygen barrier test;

Example 6, corresponding to Example 7 of the oxygen barrier test.

EXAMPLE 7

A liner compound was made from 75 parts HDPE, 25 parts butyl rubber, three parts talcum and one part zeolite Na-A.

Again, a sample of Dareform 6493M was used as another comparison.

Figure 2:
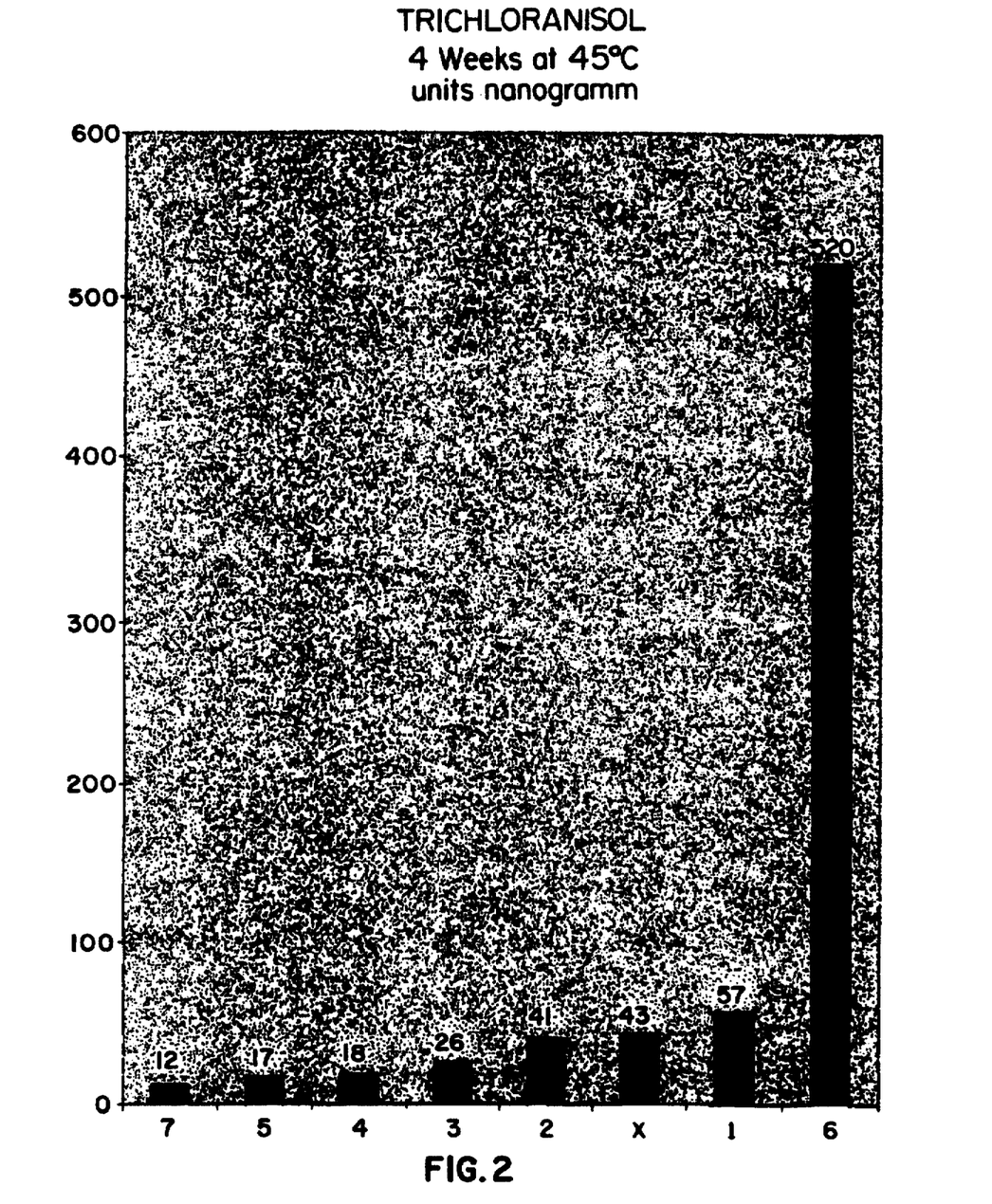
FIG. 2 is a bar graph illustration of the results measuring the barrier properties against trichloranisol migration of the same samples in FIG. 1.

The amounts of trichloranisol (in nanograms), which had migrated through the examples' liners after 4 weeks at 45° C. are indicated above, and represented by, the columns in FIG. 2. The numbering of the columns corresponds to that of the examples; "X" indicates Dareform.

The addition of EVA to replace some of the HDPE (Example 6) destroys the TCA barrier properties. Surprisingly, the lower levels of butyl rubber do not raise the transmission of TCA through the polymer blend film.

An improvement over Example 1 can be achieved by exchanging HDPE for LDPE (see 2), adding talcum, molecular sieves (zeolites) (see 3–5); Example 7 shows the best results.

The improvement between Example 1 and 3 and 2 and 3 needed explanation. An optical analysis of the film structure in Example 3 using polarized light and a microscope showed three zones where the two outer zones were optically similar.

It appears that a sandwich type structure is present in Example 3 but not to be found in 1 or 2. There was no sharp interface between the zones but more of a gradual change from the one to the other. A measurement of the Shore hardness of straight HDPE and the surface of Example 3 showed values of D 55 and D 52 (very hard) whereas the butyl rubber is very soft. The Shore hardness of Example 1 was DS 40 and of Example 2 D 41, indicating a homogeneous rather than a heterogeneous mixture. The Dataform 6493M has a Shore D hardness of D 26. The other samples in accordance with this invention (4, 5 and 7) showed a similar, inhomogeneous structure.

U.S. Pat. No. 5,211,974 teaches that a homogeneous mixture is desirable, therefore the results of Example 3 are most surprising and, therefore, do not conform with these teachings. After manufacturing crowns using Examples 3 and 4 it could be seen that this sandwich or pseudolaminate structure was present. With a Shore hardness of D 52 it could not be expected that this mixture would be a suitable sealant and form itself into damaged areas on a returnable beer bottle. Surprisingly, the sealing characteristics were excellent and after pasteurization (20 minutes at 72° C.) good venting properties were measured.

Other products and mixtures, e.g. Dataform 6493M, Examples 1 and 2, also exhibit venting characteristics.

It is remarkable how much the addition of platelike particulate fillers such as mica and talcum improves the barrier properties. We assume that there is a synergistic co-action with the layered structure of the inhomogeneous liner compound blend.

Another feature of any closure/sealant system is the so-called stacking or headload test. Pallets of bottles with a closure are stacked up to 4 high giving individual loads of up to 60 kg per bottle. In addition, this stacking test is carried out at different temperatures depending on the climate. Many companies test up to 45 kg at various temperatures, one multinational 60 kg at 38° C.

In a comparative test, crown corks were provided with liners on a commercial state of the-art in-shell molding machine. The liner compounds corresponded to Examples 1, 2 and 3, respectively.

The crowns with liners according to Example 1 and 2 failed the test under headload of 60 kg at 38° C. for 4½ weeks, due to the liner being cut through by the bottle. Crowns lined in the same way with Dataform 6493M also failed the test.

Crowns with liners according to Example 3 passed the test.

It was decided to check The effects of amorphous polypropylenes as a replacement for some of the HDPE in order to increase the softening point of the sealant. This is necessary where products such as fruit juices are filled at 95° C. Under these conditions HDPE may not always have the necessary heat resistance.

Four compositions were made as follows:

Composition 1

(corresponds to Example 4 above)

Composition 2

A liner compound was made from 50 parts HDPE, 25 parts butyl rubber, 25 parts polypropylene (Stamyroid 40 CF) and 3 parts talcum.

Composition 3

A liner compound was made as in composition 2, but with 25 parts polypropylene/polyethylene (Eastoflex E 1060 from Eastman Kodak) replacing the polypropylene.

Composition 4

A liner compound was made as in composition 2, but with 25 parts polypropylene-butene/ethylene terpolymer (Eastoflex T 1035 from Eastman Kodak) replacing the polypropylene.

Figure 3:
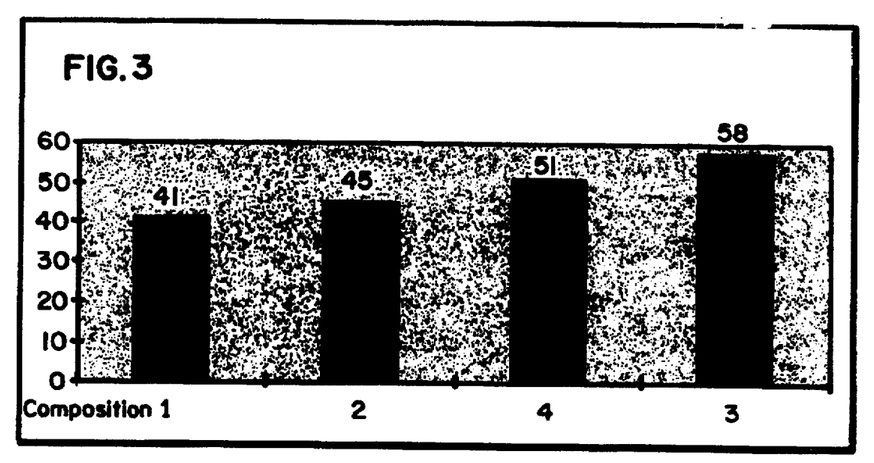
FIG. 3 is a bar graph showing results of oxygen barrier measurements of compositions 1–4.
Figure 4:
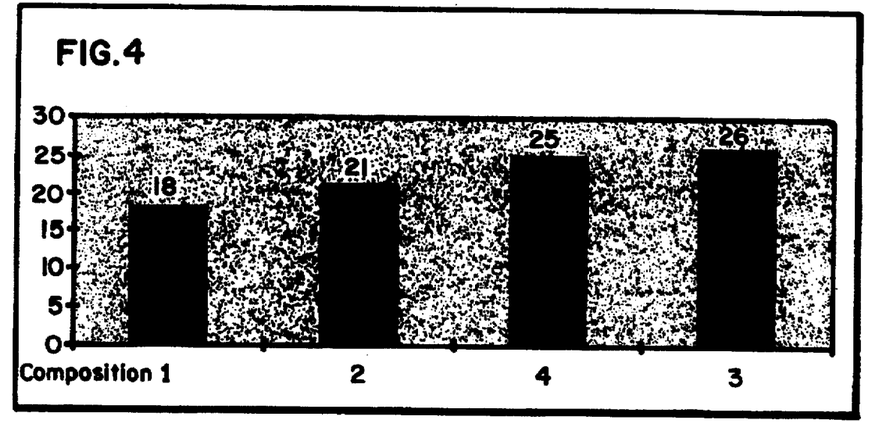
FIG. 4 is a bar graph showing results of trichloranisol migration measurements of compositions 1–4.

These compositions were analyzed for their oxygen and trichloranisol barrier properties, as above described. The results are shown in FIGS. 3 and 4. They indicate that HDPE can be at least partly replaced by other hard polymers, without losing the advantages of the invention.

The container closures of the invention have both a pronounced barrier effect and valve properties. They can also withstand mechanical stresses under which conventional closures ate destroyed.

Even after time spans of several months hardly any penetration of oxygen, benzene or chloranisol into the interior of the container has been observed. If the interior pressure in the container is increased, then the container closures according to the invention allow the excess pressure to exit before the latter can increase to dangerous values.

By suitable choice of the constituents added for hardness modification, the polymer compound of the molding may be designed in such a way that it withstands even the elevated temperature which occurs during bottle pasteurization.

The closures produced according to the invention are ready for use after hardening of the polymer compound and may be stored until their use; the properties of the molding which forms the inner insert do not change even over lengthy periods.

It goes without saying that, apart from the use described here in conjunction with crown corks and screw caps, ocher sealing elements for container closures can also be produced in which the corresponding molding is or is not solidly connected or adhered to the closure body.

We claim:

1. A potable liquid container comprising a container, a container closure and a closure liner formed by placing and in-shell or out-shell molding a molten piece of a poylymer liner compound in the closure, the molded closure liner consisting essentially of a heterogeneous blend of unvulcanized and uncross-linked butyl rubber and of at least one thermoplastic polymer, wherein the heterogeneous blend of the closure liner consists of areas or layers enriched in butyl rubber alternating with areas or layers enriched in thermoplastic polymer, and wherein the thermoplastic polymer is a high-density polyethylene (HDPE) or mixtures of a high-density polyethylene with another polymer selected from polypropylene (PP), polypropylene-copolymers and -terpolymers, poly(ethylene-vinylalcohol) (EVOH) and mixtures thereof.

2. The container of claim 1, wherein the weight ratio of butyl rubber and thermoplastic polymer in said blend is chosen to provide controlled mixing incompatibility of the butyl rubber and the thermoplastic polymer in the solid molded state of said liner compound, said structure being formed during the in-shell or out-shell molding of said blend.

3. The container of claim 2, wherein said liner compound comprises a heterogeneous blend of more than 60 weight-% (based on total polymer content) of high-density polyethylene and less than 40 weight-% (on same basis) of butyl rubber.

4. The container of claim 3, wherein the high-density polyethylene is present in said blend in an amount between about 70 and 80 weight-% and said butyl rubber is present in said blend in an amount between about 20 and 30 weight-%, based on total polymer content in said blend.

5. The container of claim 4, said amount of high-density polyethylene being about 75 weight-% and said amount of butyl rubber being about 25 weight-%.

6. The container of claim 1, said liner further comprising a particulate filler material.

7. The container of claim 6, said filler comprising platelike flat particles.

8. The container of claim 7, said particles being selected from the group comprising talcum, mica and kaolin.

9. The container of claim 6, said filler comprising at least one zeolite substance capable of physically binding at least one contaminant, including oxygen and off-flavour producing substances such as volatile chlorinated phenols or anisols.

10. The container of claim 1, wherein the container is a bottle and the closure is a bottle crown or a screw cap, and the closure is made of metal or plastic material.

11. The container of claim 10, wherein said bottle is a beer bottle, said closure is a crown cork and said bottle is filled with beer.

12. The container of claim 10, wherein said bottle is a juice bottle and said closure is a plastic or aluminium screw cap, of a width up to about 50 mm, and said bottle is filled with juice.

13. The container of claim 1, wherein the thermoplastic polymer is a blend of at least 50 parts HDPE and not more than 50 parts of another hard polymer selected from polypropylene (PP), polypropylene-polyethylene (PP-PE), polypropylene-butene/ethylene terpolymer and mixtures thereof.

14. The container of claim 13, wherein the thermoplastic polymer is a blend of about 50 parts EDPE and about 25 parts of said PP, PP-PE, terpolymer or mixture thereof.

15. A potable liquid container comprising a container, a container closure and a closure liner formed by placing and in-shell or out-shell molding a molten piece of a polymer liner compound in the closure, said closure liner consisting essentially of a heterogeneous polymer liner blend of unvulcanized and uncross-linked butyl rubber and high density polyethylene, said closure being capable of preventing ingress of oxygen and volatile off-flavor producing substances into the potable liquid, and being capable of venting gas and/or vapour from the container in the range between 5 and 12 bar.

16. A potable liquid container comprising a container, a container closure and a closure liner formed by in-shell or out-shell molding a molten piece of a polymer liner compound provided in the closure, said container being a bottle and said closure being a bottle crown, said closure liner consisting essentially of a heterogeneous polymer liner blend consisting of unvulcanized and uncross-linked butyl rubber and high-density polyethylene, wherein said closure liner is not damaged when said crown closure is placed under a headload of up to 60 kg at a temperature of up to 40° C.

17. The container of claim 16, wherein said closure liner is not damaged when said crown closure is placed under a headload of up to 60 kg at a temperature of up to 45° C.

18. A potable liquid container comprising a container, a container closure and a closure liner formed by placing and in-shell molding a molten piece of a polymer liner compound in the closure, said liner compound consisting essentially of a minor amount of unvulcanized and uncross-linked butyl rubber and a major amount of thermoplastic polymer, said liner having a heterogeneous structure comprising areas or layers enriched in butyl rubber and areas or layers enriched in thermoplastic polymer, and a particulate filler material, said filler particles having a platelike flat shape.

19. The container of claim 18, said filler material being selected from the group comprising talcum, mica, kaolin and mixtures thereof.

20. The container of claim 19, said compound further comprising a minor amount of butyl rubber and a major amount of hard thermoplastic polymer, said liner having a heterogeneous structure comprising areas or layers enriched in butyl rubber and areas or layers enriched in hard thermoplastic polymer.

21. The container of claim 20, said hard polymer having a hardness of at least Shore D 45.

22. The container of claim 21, said hard polymer having a hardness above Shore D 50.

* * * * *

UNITED STATES PATENT AND TRADEMARK OFFICE
CERTIFICATE OF CORRECTION

PATENT NO. : 5,731,053

DATED : March 24, 1998

INVENTOR(S) : TINO KUHN et al.

It is certified that error appears in the above-identified patent and that said Letters Patent is hereby corrected as shown below:

On the title page,

In item [75], for "Sturh", read —Stuhr—.

In column 5, lines 2 and 12, for "MDPE" read —HDPE—.

In column 8, line 15, for "beet" read —best—

In column 8, line 17, for "EDPE" read —HDPE—.

In column 9, line 65, for "EDPE" read —HDPE—.

In column 10, line 33, for "MDPE" read —HDPE—.

In column 10, line 60, for "wae" read —was—.

In column 11, line 17, for "D-398" read —D-3985—.

In column 11, lines 48 and 54, for "Dareform" read —Daraform—.

In column 13, line 38, for "poylymer" read —polymer—.

In column 14, line 31, for "EDPE" read —HDPE—.

In column 14, line 37, after "blend" insert — consisting—.

Signed and Sealed this

Second Day of March, 1999

Attest:

Attesting Officer

Q. TODD DICKINSON

Acting Commissioner of Patents and Trademarks